United States Patent
Li et al.

(10) Patent No.: US 10,841,022 B2
(45) Date of Patent: Nov. 17, 2020

(54) RADIO RESOURCE MANAGEMENT MEASUREMENT METHOD AND APPARATUS

(71) Applicant: Huawei Technologies Co., Ltd., Shenzhen (CN)

(72) Inventors: Xiaocui Li, Beijing (CN); Kai Xu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 26 days.

(21) Appl. No.: 15/735,886

(22) PCT Filed: Nov. 6, 2015

(86) PCT No.: PCT/CN2015/093946
§ 371 (c)(1),
(2) Date: Dec. 12, 2017

(87) PCT Pub. No.: WO2017/075795
PCT Pub. Date: May 11, 2017

(65) Prior Publication Data
US 2019/0007147 A1  Jan. 3, 2019

(51) Int. Cl.
*H04B 17/318* (2015.01)
*H04W 24/00* (2009.01)
(Continued)

(52) U.S. Cl.
CPC .......... *H04B 17/318* (2015.01); *H04W 24/00* (2013.01); *H04W 24/10* (2013.01); *H04W 72/042* (2013.01); *H04W 76/27* (2018.02)

(58) Field of Classification Search
CPC .. H04B 17/318; H04W 72/042; H04W 76/27; H04W 24/10
See application file for complete search history.

(56) References Cited

U.S. PATENT DOCUMENTS

| | | | |
|---|---|---|---|
| 2006/0009202 A1 | 1/2006 | Gallagher et al. | |
| 2009/0036114 A1 | 2/2009 | Mohebbi | |

(Continued)

FOREIGN PATENT DOCUMENTS

| | | |
|---|---|---|
| CN | 1981482 A | 6/2007 |
| CN | 101711459 A | 5/2010 |

(Continued)

OTHER PUBLICATIONS

Machine Translation and Abstract of Chinese Publication No. CN104602267, May 6, 2015, 38 pages.

(Continued)

*Primary Examiner* — Jackie Zuniga Abad
(74) *Attorney, Agent, or Firm* — Conley Rose, P.C.

(57) ABSTRACT

A radio resource management (RRM) measurement method and apparatus, where the method includes receiving, by the terminal device, indication information from the network device, where the indication information indicates a time-frequency resource used to perform received signal strength indicator (RSSI) measurement on the unlicensed carrier, performing, by the terminal device on the time-frequency resource, the RSSI measurement on the unlicensed carrier to obtain an RSSI measurement result, and sending, by the terminal device, the RSSI measurement result to the network device.

14 Claims, 5 Drawing Sheets

(51) Int. Cl.
*H04W 76/27* (2018.01)
*H04W 24/10* (2009.01)
*H04W 72/04* (2009.01)

(56) References Cited

U.S. PATENT DOCUMENTS

| | | | |
|---|---|---|---|
| 2010/0232365 A1 | 9/2010 | Lu et al. | |
| 2015/0173039 A1 | 6/2015 | Rune et al. | |
| 2016/0227427 A1* | 8/2016 | Vajapeyam | H04W 72/085 |
| 2016/0302230 A1* | 10/2016 | Novlan | H04B 17/318 |
| 2016/0330641 A1 | 11/2016 | Zhang et al. | |

FOREIGN PATENT DOCUMENTS

| | | |
|---|---|---|
| CN | 104579518 A | 4/2015 |
| CN | 104602267 A | 5/2015 |
| JP | 2015515816 A | 5/2015 |
| WO | 2015109516 A1 | 7/2015 |
| WO | 2015166886 A1 | 11/2015 |

OTHER PUBLICATIONS

"3rd Generation Partnership Project; Technical Specification Group Radio Access Network; Evolved Universal Terrestrial Radio Access (E-UTRA); Physical layer; Measurements (Release 12)," 3GPP TS 36.214 V12.2.0, Technical Specification, Mar. 2015, 17 pages.
"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 V12.7.0, Technical Specification, Sep. 2015, 453 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.1.0, Technical Specification, Sep. 2015, 254 pages.
Foreign Communication From a Counterpart Application, PCT Application No. PCT/CN2015/093946, English Translation of International Search Report dated Jul. 28, 2016, 2 pages.
Huawei, "RSSI-like measurement and report for LAA carriers," 3GPP TSG RAN WG1 Meeting #82bis, R1-155102, Oct. 5-9, 2015, 3 pages.
Huawei, "Rssi Measurement in LAA," 3GPP TSG-RAN WG2 #91bis, R2-154266, Oct. 5-9, 2015, 4 pages.
Foreign Communication From a Counterpart Application, Korean Application No. 10-2017-7037000, Korean Office Action dated Nov. 22, 2018, 5 pages.
Foreign Communication From a Counterpart Application, Korean Application No. 10-2017-7037000, English Translation of Korean Office Action dated Nov. 22, 2018, 3 pages.
Machine Translation and Abstract of International Publication No. WO2015166886, Nov. 5, 2015, 138 pages.
Samsung, et al., "WF on UE-reported RSSI measurements for LAA," 3GPP TSG RAN WG1 Meeting #82bis, R1-156198. Oct. 5-9, 2015, 3 pages.
Foreign Communication From a Counterpart Application, Japanese Application No. 2018-500893, Japanese Office Action dated Oct. 15, 2018, 3 pages.
Foreign Communication From a Counterpart Application, Japanese Application No. 2018-500893, English Translation of Japanese Office Action dated Oct. 15, 2018, 4 pages.
Machine Translation and Abstract of Chinese Publication No. CN104579518, Apr. 29, 2015, 44 pages.
Foreign Communication From a Counterpart Application, Chinese Application No. 201580078803.1, Chinese Search Report dated Apr. 20, 2018, 7 pages.
MediaTek Inc.,"DRS Enhancements for RRM/CSI Measurements in LAA," XP050934795, R1-151941, Apr. 20-24, 2015, 5 pages.
Huawei, et al., "RRM measurement for unlicensed carrier" XP050951347, R1-150981, Mar. 24-26, 2015, 4 pages.
LG Electronics, "RRM measurement in LAA," XP051002295, R1-155388, Oct. 5-9, 2015, 5 pages.
LG Electronics Inc.,"Channel selection based on RSSI measurement," XP051005036, R2-154472, Oct. 5-9, 2015, 2 pages.
Kyocera,"Measurement report mechanisms for RSSI," XP051005192, R2-154688, Oct. 5-9, 2015, 3 pages.
MediaTek Inc.,"RRM Measurement for LAA Carrier Selection," XP051039534, R1-154649, Aug. 24-28, 2015, 3 pages.
"3rd Generation Partnership Project; Technical Specification Group Radio Access Network; Study on Licensed-Assisted Access to Unlicensed Spectrum; (Release 13)," XP051294239, 3GPP TR 36.889 V13.0.0, Jun. 2015, 87 pages.
Foreign Communication From a Counterpart Application, European Application No. 15907637.1, Extended European Search Report dated Jun. 22, 2018, 14 pages.

* cited by examiner

RADIO RESOURCE MANAGEMENT MEASUREMENT METHOD AND APPARATUS

CROSS-REFERENCE TO RELATED APPLICATIONS

This application is a U.S. National Stage of International Patent Application No. PCT/CN2015/093946 filed on Nov. 6, 2015, which is hereby incorporated by reference in its entirety.

TECHNICAL FIELD

Embodiments of the present disclosure relate to the communications field, and in particular, to a radio resource management (RRM) measurement method and apparatus.

BACKGROUND

In an existing communications system, a terminal device may perform RRM measurement, and report an RRM measurement result to a network device. The network device may determine a current channel state of the terminal device according to the RRM measurement result reported by the terminal device. The RRM measurement result may include reference signal received quality (RSRQ). The RSRQ may be defined as N×reference signal received power (RSRP)/received signal strength indicator (RSSI). N represents a quantity of resource blocks on which the measurement is performed, and the RSRP and the RSSI are obtained by means of measurement on a same resource block set. The RSSI is a parameter required for calculating the RSRQ by the terminal device, and the terminal device does not report a value of the RSSI to the network device.

In a licensed-assisted access (LAA) using Long Term Evolution (LTE) system, a node needs to use a channel resource by means of listen before talk (LBT), that is, the node needs to contend for an unlicensed carrier resource with another node, and can use the unlicensed carrier resource only after the node obtains the resource by means of contention. In addition, the RRM measurement is mainly based on a reference signal. Transmission of a reference signal needs to comply with the LBT. Therefore, it is possible that the network device cannot obtain a transmission resource by means of contention, and the terminal device cannot perform the RRM measurement on an unlicensed carrier and therefore cannot report an RRM measurement result (for example, RSRQ). As a result, the network device cannot learn of the current channel state of the terminal device in time, and this affects scheduling performance of the network device.

SUMMARY

Embodiments of the present disclosure provide an RRM measurement method and apparatus. This helps resolve a problem that a network device cannot transmit a reference signal on an unlicensed carrier and consequently a terminal device cannot feedback an RRM measurement result.

According to a first aspect, an RRM measurement method is provided, including receiving, by a terminal device, indication information sent by a network device, where the indication information indicates a time-frequency resource used to perform RSSI measurement on an unlicensed carrier, performing, by the terminal device on the time-frequency resource, the RSSI measurement on the unlicensed carrier to obtain an RSSI measurement result, and sending, by the terminal device, the RSSI measurement result to the network device.

According to the RRM measurement method provided in the embodiments of the present disclosure, the terminal device receives the indication information that indicates the time-frequency resource used to perform the RSSI measurement on the unlicensed carrier and that is sent by the network device. The terminal device performs the RSSI measurement on the time-frequency resource indicated by the indication information, to obtain the RSSI measurement result, and sends the RSSI measurement result to the network device. This helps resolve a problem that the network device cannot transmit a reference signal on the unlicensed carrier and consequently the terminal device cannot feedback an RRM measurement result.

In a first possible implementation of the first aspect, the time-frequency resource used to perform the RSSI measurement on the unlicensed carrier is different from a time-frequency resource used to perform measurement on a discovery reference signal (DRS).

With reference to the foregoing possible implementation of the first aspect, in a second possible implementation of the first aspect, a time resource used to perform the RSSI measurement on the unlicensed carrier is different from a discovery signals measurement timing configuration (DMTC) of the unlicensed carrier.

In this case, the time-frequency resource used to perform the RSSI measurement on the unlicensed carrier and a time-frequency resource used to perform measurement on a DRS transmitted on the unlicensed carrier may be separately configured, or the time resource used to perform the RSSI measurement on the unlicensed carrier and the DMTC may be separately configured such that the RSSI measurement on the unlicensed carrier does not necessarily depend on a DRS. This resolves the problem that the network device cannot transmit a reference signal on the unlicensed carrier and consequently the terminal device cannot feedback an RRM measurement result, thereby improving system performance.

The terminal device may perform the RSSI measurement on the time-frequency resource configured by the network device, regardless of whether the network device sends a signal on the time-frequency resource using a serving cell of the terminal device. That is, the RSSI measurement performed by the terminal device on the unlicensed carrier may be dependent on a signal sent by the serving cell of the terminal device or be independent of the signal sent by the serving cell of the terminal device. The signal may be any possible signal, including a reference signal, a common downlink signal, a data packet, or the like.

With reference to the foregoing possible implementations of the first aspect, in a third possible implementation of the first aspect, performing, by the terminal device on the time-frequency resource, the RSSI measurement on the unlicensed carrier to obtain an RSSI measurement result includes determining, by the terminal device, a total receive power that is from at least one source and that is detected on the time-frequency resource, where the at least one source does not include a signal sent by a serving cell of the terminal device on the unlicensed carrier, and processing, by the terminal device, the total receive power to obtain the RSSI measurement result.

The at least one source may not include the serving cell of the terminal device. In this case, the indication information may further instruct the terminal device to perform, without depending on the signal sent by the serving cell, the RSSI measurement on the unlicensed carrier.

In this way, the terminal device can obtain the RSSI measurement result on the configured time-frequency resource in any case, and reports the RSSI measurement result to the network device such that the network device can obtain a status of a carrier around the terminal device even if the network device cannot obtain a transmission resource of the unlicensed carrier by means of contention. In this way, management and scheduling can be performed on the terminal device based on the status, and system performance can be improved.

With reference to the foregoing possible implementations of the first aspect, in a fourth possible implementation of the first aspect, the indication information includes information about an RSSI measurement time window and/or information about an RSSI measurement granularity.

With reference to the foregoing possible implementations of the first aspect, in a fifth possible implementation of the first aspect, the RSSI measurement time window is different from the DMTC, and this includes that the RSSI measurement time window and the DMTC are partially overlapped or have no intersection set at all.

With reference to the foregoing possible implementations of the first aspect, in a sixth possible implementation of the first aspect, the indication information further includes information about an RSSI valid measurement window, where the RSSI valid measurement window represents a time resource used to perform the RSSI measurement in the RSSI measurement window.

With reference to the foregoing possible implementations of the first aspect, in a seventh possible implementation of the first aspect, the indication information is carried in radio resource control (RRC) signaling.

With reference to the foregoing possible implementations of the first aspect, in an eighth possible implementation of the first aspect, the indication information is carried in downlink control information (DCI).

With reference to the foregoing possible implementations of the first aspect, in a ninth possible implementation of the first aspect, the indication information is carried in a newly-added bit of the DCI. Optionally, the indication information is further used to instruct the terminal device to perform the RSSI measurement on the unlicensed carrier or report the RSSI measurement result of the unlicensed carrier.

With reference to the foregoing possible implementations of the first aspect, in a tenth possible implementation of the first aspect, sending, by the terminal device, the RSSI measurement result to the network device includes sending, by the terminal device, the RSSI measurement result to the network device on a licensed carrier, or sending, by the terminal device, the RSSI measurement result to the network device on the unlicensed carrier.

According to a second aspect, another RRM measurement method is provided, including sending, by a network device, indication information to a terminal device, where the indication information indicates a time-frequency resource used to perform RSSI measurement on an unlicensed carrier, and receiving, by the network device, an RSSI measurement result sent by the terminal device, where the RSSI measurement result is obtained by the terminal device by performing the RSSI measurement on the time-frequency resource.

In a first possible implementation of the second aspect, the time-frequency resource used to perform the RSSI measurement on the unlicensed carrier is different from a time-frequency resource used to perform measurement on a DRS.

With reference to the foregoing possible implementation of the second aspect, in a second possible implementation of the second aspect, a time resource used to perform the RSSI measurement on the unlicensed carrier is different from a DMTC of the unlicensed carrier.

With reference to the foregoing possible implementations of the second aspect, in a third possible implementation of the second aspect, the RSSI measurement result is obtained by the terminal device by processing a total receive power that is from at least one source and that is detected on the time-frequency resource, where the at least one source does not include a signal sent by a serving cell of the terminal device on the unlicensed carrier.

With reference to the foregoing possible implementations of the second aspect, in a fourth possible implementation of the second aspect, the indication information further instructs the terminal device to perform, without depending on the signal sent by the serving cell of the terminal device, the RSSI measurement on the unlicensed carrier.

With reference to the foregoing possible implementations of the second aspect, in a fifth possible implementation of the second aspect, the indication information includes information about an RSSI measurement time window and/or information about an RSSI measurement granularity. Optionally, the information about the RSSI measurement time window may include a start position of the RSSI measurement time window, a length of the RSSI measurement time window, and a distribution period of the RSSI measurement time window.

With reference to the foregoing possible implementations of the second aspect, in a sixth possible implementation of the second aspect, the indication information further includes information about an RSSI valid measurement window, where the RSSI valid measurement window represents a time resource used to perform the RSSI measurement in the RSSI measurement window.

With reference to the foregoing possible implementations of the second aspect, in a seventh possible implementation of the second aspect, the network device semi-statically configures the time-frequency resource used to perform the RSSI measurement. Optionally, the indication information is carried in RRC signaling.

With reference to the foregoing possible implementations of the second aspect, in an eighth possible implementation of the second aspect, the network device dynamically configures the time-frequency resource used to perform the RSSI measurement, and the indication information is carried in DCI.

With reference to the foregoing possible implementations of the second aspect, in a ninth possible implementation of the second aspect, the indication information is carried in a newly-added bit of the DCI.

With reference to the foregoing possible implementations of the second aspect, in a tenth possible implementation of the second aspect, receiving, by the network device, an RSSI measurement result sent by the terminal device includes receiving, by the network device, the RSSI measurement result sent by the terminal device on a licensed carrier, or receiving, by the network device, the RSSI measurement result sent by the terminal device on the unlicensed carrier.

With reference to the foregoing possible implementations of the second aspect, in an eleventh possible implementation of the second aspect, the method further includes performing, by the network device according to the received RSSI measurement result, carrier selection or scheduling on the terminal device.

According to a third aspect, an RRM measurement apparatus is provided and is configured to execute the method in the foregoing first aspect or any possible implementation of the first aspect. Further, the apparatus includes units configured to execute the method in the foregoing first aspect or any possible implementation of the first aspect.

According to a fourth aspect, an RRM measurement apparatus is provided and is configured to execute the method in the foregoing second aspect or any possible implementation of the second aspect. Further, the apparatus includes units configured to execute the method in the foregoing second aspect or any possible implementation of the second aspect.

According to a fifth aspect, an RRM measurement apparatus is provided, and the apparatus includes a receiver, a transmitter, a memory, a processor, and a bus system. The receiver, the transmitter, the memory, and the processor are connected using the bus system, the memory is configured to store an instruction, and the processor is configured to execute the instruction stored in the memory in order to control the receiver to receive a signal and control the transmitter to send a signal. In addition, when the processor executes the instruction stored in the memory, the processor executes the method in the first aspect or any possible implementation of the first aspect.

According to a sixth aspect, an RRM measurement apparatus is provided, and the apparatus includes a receiver, a transmitter, a memory, a processor, and a bus system. The receiver, the transmitter, the memory, and the processor are connected using the bus system, the memory is configured to store an instruction, and the processor is configured to execute the instruction stored in the memory in order to control the receiver to receive a signal and control the transmitter to send a signal. In addition, when the processor executes the instruction stored in the memory, the processor executes the method in the second aspect or any possible implementation of the second aspect.

According to a seventh aspect, a computer-readable medium is provided and is configured to store a computer program, and the computer program includes an instruction used to execute the method in the first aspect or any possible implementation of the first aspect.

According to an eighth aspect, a computer-readable medium is provided and is configured to store a computer program, and the computer program includes an instruction used to execute the method in the second aspect or any possible implementation of the second aspect.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

The technical solutions of the embodiments of the present disclosure may be applied to various communications systems that support LAA, such as a Global System for Mobile Communications (GSM) system, a Code Division Multiple Access (CDMA) system, a Wideband CDMA (WCDMA) system, a general packet radio service (GPRS), an LTE system, an LTE frequency division duplex (FDD) system, an LTE time division duplex (TDD), a Universal Mobile Telecommunications System (UMTS), a Worldwide Interoperability for Microwave Access (WIMAX) communications system, a future fifth generation (5G) system, or the like.

Figure 1:
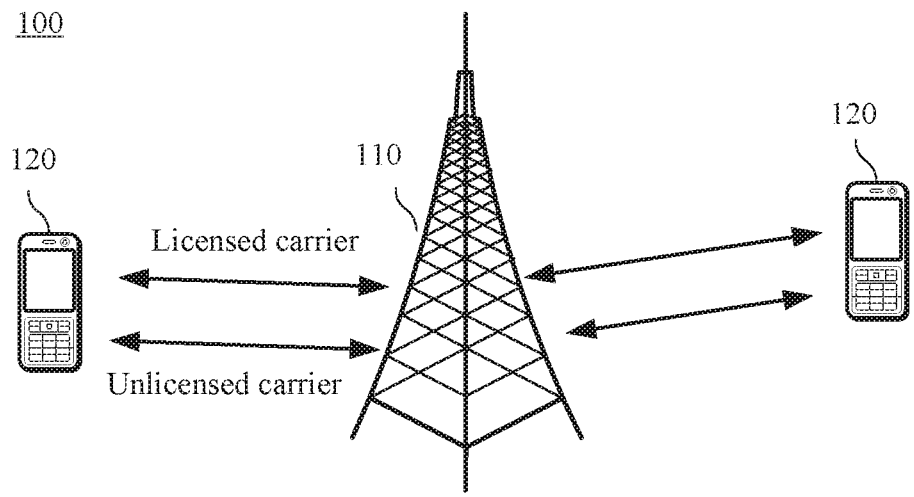
FIG. 1 is a schematic diagram of a radio communications system applied to an embodiment of the present disclosure.

FIG. 1 shows a radio communications system 100 applied to an embodiment of the present disclosure. The radio communications system 100 may include at least one network device 110. The network device 110 may be a device that communicates with a terminal device. Each network device 110 may provide communications coverage for a specific geographic area, and may communicate with a terminal device (for example, user equipment (UE)) located in the coverage area. The network device 110 may be a base transceiver station (BTS) in a GSM system or a CDMA system, or a NodeB (NB) in a WCDMA system, or an evolved NodeB (eNB or eNB) in an LTE system, or a radio controller in a cloud radio access network (CRAN), or the network device may be a relay node, an access point, an in-vehicle device, a wearable device, a network side device in a future 5G network, or a network device in a future evolved public land mobile network (PLMN).

The radio communications system 100 further includes multiple terminal devices 120 located in a coverage area of the network device 110. The terminal device 120 may be mobile or fixed. The terminal device 120 may be referred to as an access terminal, UE, a subscriber unit, a subscriber station, a mobile station, a remote station, a remote terminal, a mobile device, a user terminal, a terminal, radio communications equipment, a user agent, or a user apparatus. The access terminal may be a cellular phone, a cordless phone, a session initiation protocol (SIP) phone, a wireless local loop (WLL) station, a personal digital assistant (PDA), a hand-held device having a wireless communications function, a computing device, or another processing device connected to a wireless modem, an in-vehicle device, a wearable device, a terminal device in a future 5G network, a terminal device in a future evolved PLMN, or the like.

FIG. 1 shows an example of one network device 110 and two terminal devices 120. Optionally, the radio communications system 100 may include multiple network devices 110, and another quantity of terminal devices 120 may be included in a coverage range of each network device, but this is not limited in this embodiment of the present disclosure.

Optionally, the radio communications system 100 may include another network entity such as a network controller or a mobility management entity, but this embodiment of the present disclosure is not limited thereto.

The radio communications system 100 may support LAA. For example, the radio communications system 100 includes LAA-LTE or another communications system, but this is not limited in this embodiment of the present disclosure. When the network device 110 and the terminal device 120 perform communications in an LAA manner, not only a licensed spectrum but also an unlicensed spectrum may be used. An unlicensed spectrum is integrated to a cellular communications network (for example, LTE) that originally uses only a licensed spectrum, and the unlicensed spectrum may be used as an auxiliary component carrier in a carrier aggregation scenario. A licensed spectrum can be used only after authorization is obtained, and an unlicensed spectrum can be legally used by anyone without requiring authorization. In this case, a carrier on the licensed spectrum is referred to as a licensed carrier, and a carrier on the unlicensed spectrum is referred to as an unlicensed carrier.

In an LAA using LTE system or another communications system that supports LAA, the network device 110 may perform scheduling on an unlicensed carrier with assistance of a licensed spectrum. An LBT mechanism may be used for access of the unlicensed carrier. Before using an unlicensed carrier to perform data transmission, the network device 110 or the terminal device 120 may contend for a resource on the unlicensed carrier with a node in a wireless local area network (WLAN) and another node using LAA in a cellular network, and then uses the resource obtained by means of contention to perform data transmission. The terminal device 120 or the network device 110 may contend for a resource in a manner that is based on load based equipment (LBE) or that is based on frame based equipment (FBE). In the LBE manner, whether to contend for a channel and channel occupation duration are determined based on whether data is currently to be transmitted and an amount of to-be-transmitted data, and in the FBE manner, a channel is contended for and is occupied for specific duration according to a frame structure, but this is not limited in this embodiment of the present disclosure.

Figure 2:
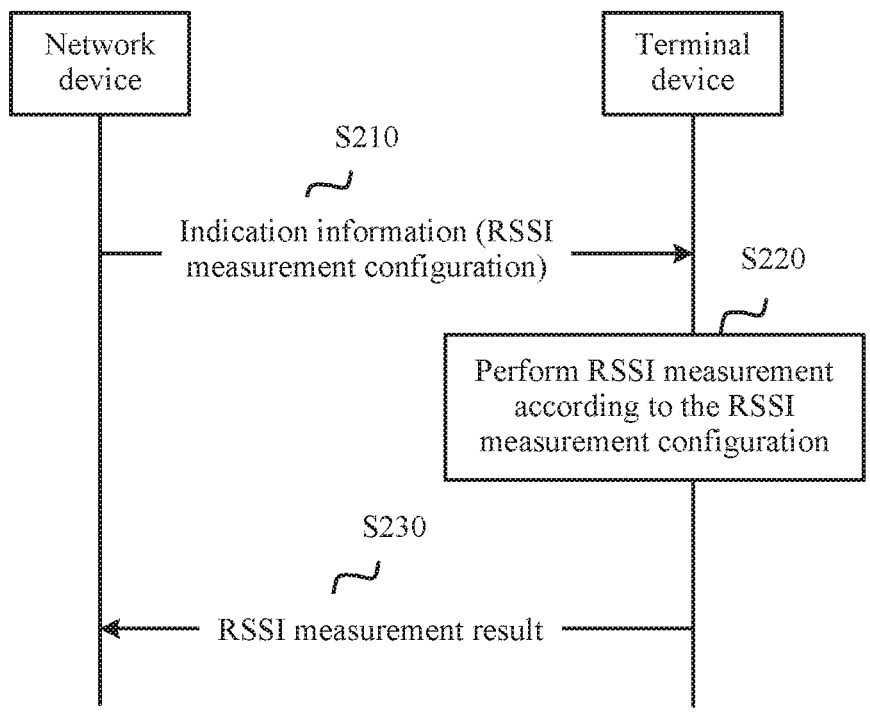
FIG. 2 is a schematic flowchart of an RRM measurement method according to an embodiment of the present disclosure.

FIG. 2 shows an RRM measurement method 200 according to an embodiment of the present disclosure. The RRM measurement method 200 may be applied to the radio communications system 100 shown in FIG. 1, but this is not limited in this embodiment of the present disclosure.

Step S210: A network device sends indication information to a terminal device, where the indication information indicates a time-frequency resource used to perform RSSI measurement on an unlicensed carrier (i.e. RSSI measurement configuration).

The network device may determine the time-frequency resource used to perform the RSSI measurement on the unlicensed carrier, and sends the indication information to the terminal device. Optionally, the indication information may be different from indication information used to configure a DMTC, or the indication information may be not carried in signaling used to configure the DMTC. That is, the network device may separately configure the DMTC and the time-frequency resource used to perform the RSSI measurement such that the RSSI measurement performed by the terminal device on the unlicensed carrier may not depend on a DRS. The network device and the terminal device may support LAA, that is, the terminal device may use an unlicensed carrier or a licensed carrier to perform communication with the network device in a cellular network. Optionally, the network device may send the indication information to the terminal device on a licensed carrier or the unlicensed carrier, and this is not limited in this embodiment of the present disclosure.

Optionally, the indication information may indicate an RSSI measurement configuration of the unlicensed carrier. Optionally, the indication information may be further used to instruct the terminal device to perform the RSSI measurement on the unlicensed carrier. The RSSI measurement configuration may include the time-frequency resource used to perform the RSSI measurement, and the time-frequency resource may include a frequency resource and/or a time resource. The time-frequency resource used to perform the RSSI measurement and a time-frequency resource used to perform measurement on a DRS may be separately configured, that is, the two time-frequency resources may be the same or different. As an optional embodiment, the time-frequency resource used to perform the RSSI measurement may be different from the time-frequency resource used to perform measurement on the DRS, and this may be one of the following cases.

A time resource used to perform the RSSI measurement is different from a time resource used to perform measurement on the DRS, while a frequency resource used to perform the RSSI measurement is the same as a frequency resource used to perform measurement on the DRS. A frequency resource used to perform the RSSI measurement is different from a frequency resource used to perform measurement on the DRS, while a time resource used to perform the RSSI measurement is the same as a time resource used to perform measurement on the DRS, or a time resource used to perform the RSSI measurement is different from a time resource used to perform measurement on the DRS, and a frequency resource used to perform the RSSI measurement is different from a frequency resource used to perform measurement on the DRS.

In this case, the RSSI measurement may no longer depend on a DRS. This helps avoid a case that the network terminal cannot send a reference signal and consequently the terminal device cannot perform the RSSI measurement.

Figure 3:
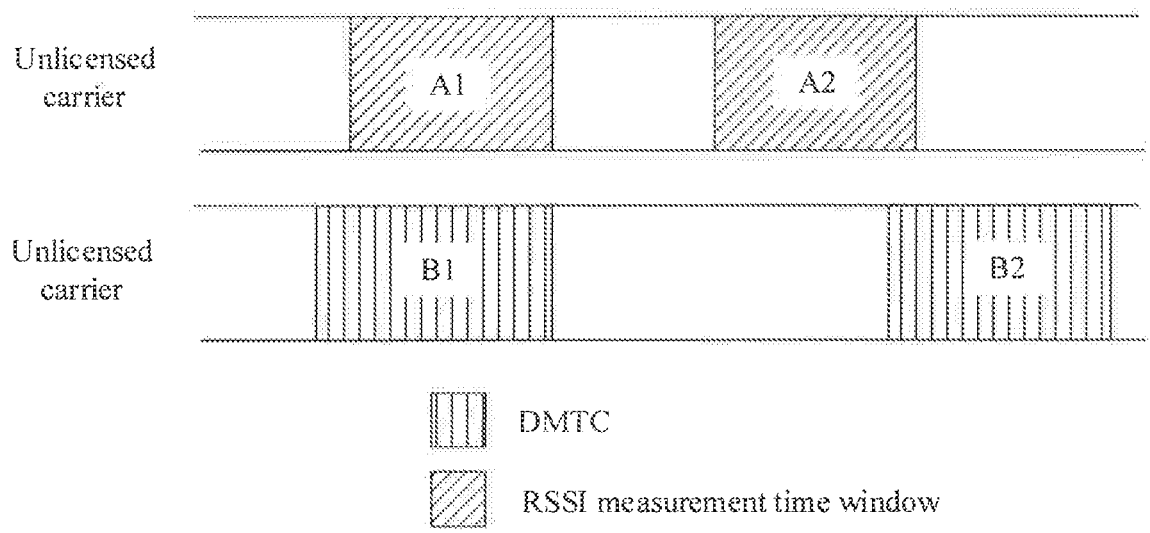
FIG. 3 is a schematic diagram of an RRM measurement configuration according to an embodiment of the present disclosure.

As an optional embodiment, the indication information may indicate the time resource used to perform the RSSI measurement, or further indicates the frequency resource used to perform the RSSI measurement. The time resource used to perform the RSSI measurement and the DMTC may be separately configured. The time resource (for example, a time window used to perform the RSSI measurement) used to perform the RSSI measurement may be the same as the DMTC or be different from the DMTC. The DMTC may be a time window used to perform measurement on a DRS transmitted on the unlicensed carrier. Optionally, the time resource used to perform the RSSI measurement may be different from the DMTC, that is, the time resource used to perform the RSSI measurement and the DMTC may be partially overlapped or have no intersection set. FIG. 3 shows an example of time resources A1 and A2 used to perform the RSSI measurement on the unlicensed carrier and DMTCs B1 and B2 used to perform measurement on the DRS transmitted on the unlicensed carrier. A1 is totally overlapped with B1, and A2 and B2 are partially overlapped, but this is not limited in this embodiment of the present disclosure.

As an example, the time resource used to perform the RSSI measurement may include at least one subframe or include multiple symbols. For example, the time resource used to perform the RSSI measurement or the time window used to perform the RSSI measurement may include N subframes or orthogonal frequency division multiplexing (OFDM) symbols, and N>1. The N subframes (or OFDM symbols) may include at least one subframe (or OFDM symbol) that does not belong to the DMTC, but this is not limited in this embodiment of the present disclosure.

Step S220: The terminal device receives the indication information sent by the network device and performs, on the time-frequency resource indicated by the indication information, the RSSI measurement on the unlicensed carrier to obtain an RSSI measurement result.

The terminal device may perform measurement on N resource blocks in the time-frequency resource used to perform the RSSI measurement. Further, the terminal device may perform measurement on the N resource blocks on a measurement band of some or all OFDM symbols in a measurement subframe, and perform arithmetic or weighted averaging on a total receive power that is from all sources and that is observed in the N resource blocks in order to obtain the RSSI measurement result. The all resources may include a serving cell and a non-serving cell of a co-channel, adjacent channel interference, thermal noise, and the like, and this embodiment of the present disclosure is not limited thereto.

Step S230: The terminal device sends the RSSI measurement result to the network device.

When obtaining one RSSI measurement result each time, the terminal device may send the obtained RSSI measurement result to the network device. Alternatively, after obtaining a predetermined quantity of multiple RSSI measurement results, the terminal device may send the multiple RSSI measurement results to the network device, or process the multiple RSSI measurement results and send the processed RSSI measurement results to the network device, and this is not limited in this embodiment of the present disclosure.

The network device may receive the RSSI measurement result sent by the terminal device, determine interference and load statuses of a carrier around the terminal device according to the RSSI measurement result, and perform management and scheduling on the terminal device based on the measurement result. For example, the network device may perform carrier selection or scheduling on the terminal device according to the RSSI measurement result, but this is not limited in this embodiment of the present disclosure.

In this way, the time resource used to perform the RSSI measurement on the unlicensed carrier by the terminal device is configured to be not totally the same as the DMTC such that the RSSI measurement configuration may be independent of the DMTC. The RSSI measurement performed by the terminal device on the unlicensed carrier does not need to depend on the DRS. This can avoid a problem that the network device cannot transmit a DRS on the unlicensed carrier and consequently the terminal device cannot perform measurement on the unlicensed carrier, and can improve a probability that the terminal device can perform the RSSI measurement on the unlicensed carrier such that a base station can obtain interference and load statuses of a carrier around the terminal device in time.

Therefore, according to the RRM measurement method provided in this embodiment of the present disclosure, the network device separately configures the time-frequency resource used to perform the RSSI measurement on the unlicensed carrier and the time-frequency resource used to perform measurement on the DRS transmitted on the unlicensed carrier, and sends the indication information that indicates the time-frequency resource used to perform the RSSI measurement on the unlicensed carrier to the terminal device such that the terminal device performs, on the time-frequency resource indicated by the indication information, the RSSI measurement on the unlicensed carrier to obtain the RSSI measurement result, and sends the RSSI measurement result to the network device. This helps resolve a problem that the network device cannot transmit a reference signal on the unlicensed carrier and consequently the terminal device cannot feedback an RRM measurement result. In addition, the network device may perform carrier selection or scheduling on the terminal device according to the RSSI measurement result reported by the terminal device. This helps improve scheduling performance of the network device and overall system performance.

In this embodiment of the present disclosure, the terminal device may perform the RSSI measurement on the configured time-frequency resource. In this case, it is possible that the network device obtains a transmission resource of the unlicensed carrier by means of contention and transmits any downlink signal or data packet on the time-frequency resource using the serving cell of the terminal device. A coverage area of the network device is divided into multiple sectors including the serving cell. Accordingly, the RSSI measurement result obtained by the terminal device on the time-frequency resource includes contribution of the serving cell of the terminal device. Alternatively, it is possible that the network device cannot obtain a transmission resource of the unlicensed carrier by means of contention and cannot transmit any downlink signal or data packet on the time-frequency resource using the serving cell of the terminal device. Accordingly, the RSSI measurement result obtained by the terminal device on the time-frequency resource does not include contribution of the serving cell of the terminal device. In this way, regardless of whether the network device transmits a signal on the unlicensed carrier using the serving cell, the terminal device can always obtain and report the RSSI measurement result of the unlicensed carrier such that the network device can learn of, based on the RSSI measurement result, current information related to the terminal device and perform management and scheduling in order to improve management and scheduling performance of the network device and improve the overall system performance.

As an optional embodiment, performing, on the time-frequency resource, the RSSI measurement on the unlicensed carrier to obtain an RSSI measurement result in step S220 includes determining a total receive power that is from at least one source and that is detected on the time-frequency resource, where the at least one source does not include a signal sent by a serving cell of the terminal device on the unlicensed carrier, and processing the total receive power to obtain the RSSI measurement result.

In this case, the RSSI measurement result is obtained by the terminal device by processing the total receive power that is from the at least one source and that is detected on the time-frequency resource, and the at least one source does not include the signal sent by the serving cell of the terminal device on the unlicensed carrier. That is, the terminal device may perform the RSSI measurement on the unlicensed carrier without depending on the signal sent by the serving cell of the terminal device.

In this embodiment of the present disclosure, the network device may indicate, in various manners, the time-frequency resource used to perform the RSSI measurement on the unlicensed carrier. As an optional embodiment, the indication information may include information about an RSSI measurement time window and/or information about an RSSI measurement granularity.

The RSSI measurement time window represents a time resource window used to perform the RSSI measurement, and some or all time resources in the RSSI measurement time window may be used to perform the RSSI measurement. Optionally, the RSSI measurement time window and the DMTC may be separately configured. For example, the RSSI measurement time window may be different from the DMTC, that is, the RSSI measurement time window and the DMTC may be partially overlapped or have no intersection set at all, or the RSSI measurement time window may be a part of the DMTC, or the DMTC may be a part of the RSSI measurement time window, but this is not limited in this embodiment of the present disclosure. Optionally, the RSSI measurement time window may be periodically distributed. In this case, the indication information may further include information about start time (for example, a start subframe or a start symbol), a length, and a distribution period of the RSSI measurement time window. Accordingly, the terminal device may determine the RSSI measurement time window according to the foregoing parameters.

The network device configures the RSSI measurement time window of the unlicensed carrier such that the terminal device performs the RSSI measurement only in the RSSI measurement time window configured by the network device, and does not need to continuously perform the RSSI measurement, thereby reducing power consumption of the terminal device.

Figure 4:
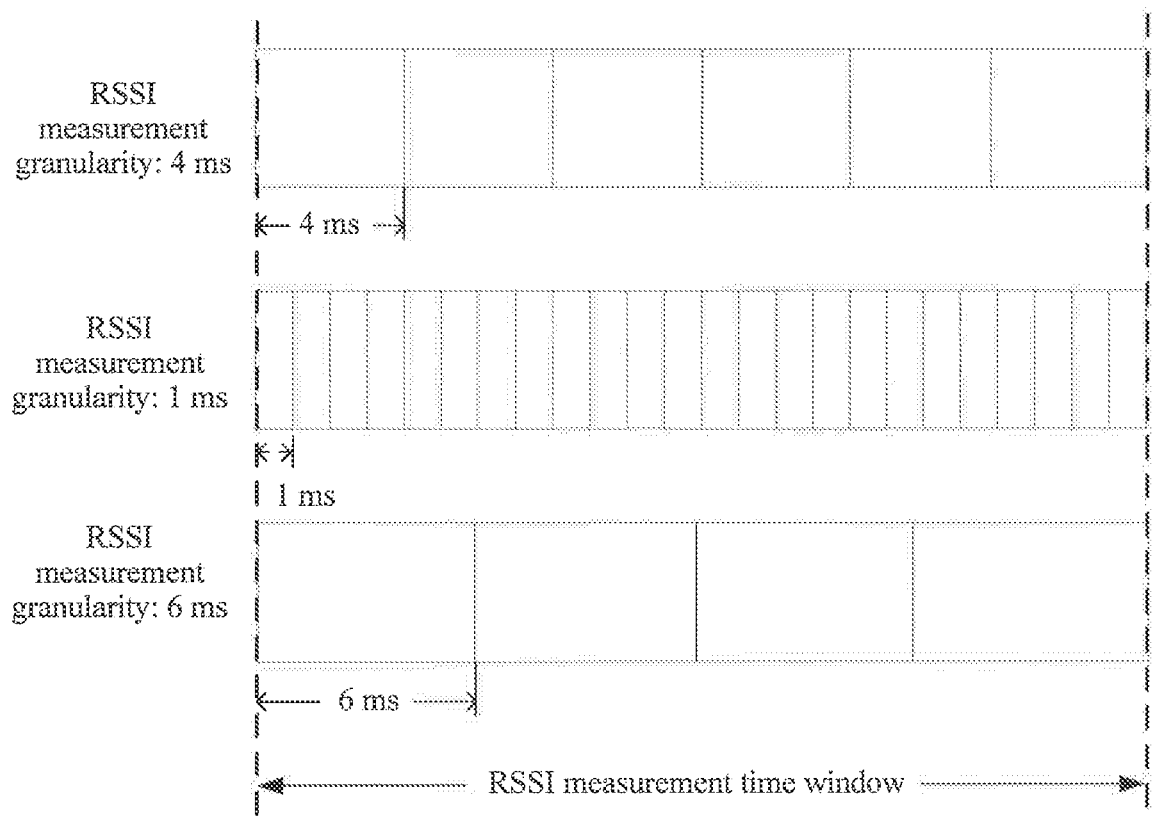
FIG. 4 is a schematic diagram of an RSSI measurement configuration in an RRM measurement method according to an embodiment of the present disclosure.

The RSSI measurement granularity may represent a minimum time resource unit for obtaining an RSSI, that is, the terminal device may perform measurement on multiple resource blocks on a time resource that is in the RSSI measurement time window and whose length is the RSSI measurement granularity, and perform arithmetic averaging or weighted averaging on a total receive power detected on the multiple resource blocks to obtain the RSSI. The network device may set different RSSI measurement granularities according to different requirements. The network device may configure different RSSI measurement granularities for different unlicensed carriers or configure different RSSI measurement granularities for different terminal devices, and this is not limited in this embodiment of the present disclosure. For example, the RSSI measurement granularity of the unlicensed carrier may be set to a length of one symbol or a length of several symbols. As shown in FIG. 4, the RSSI measurement granularity of the unlicensed carrier may be set to 1 millisecond (ms), 4 ms, or 6 ms, or the network device may set the RSSI measurement granularity to another value such as 10 ms or 13 ms, and this is not limited in this embodiment of the present disclosure. Optionally, the network device may set different RSSI measurement granularities according to different transmission duration in LAA such that the RSSI measurement granularity is related to transmission duration, and the RSSI measurement result of the terminal device can better reflect or present a load or interference status of the unlicensed carrier, but this is not limited in this embodiment of the present disclosure.

In addition, optionally, a length of the RSSI measurement time window may be an integer multiple of the RSSI measurement granularity, and in this way, the terminal device can obtain at least one RSSI in one RSSI measurement time window. As shown in FIG. 4, the length of the RSSI measurement time window of the unlicensed carrier is 24 ms. The network device may configure the RSSI measurement granularity as 4 ms. In this case, if all time resources in the RSSI measurement time window can be used to perform the RSSI measurement, the terminal device may obtain six RSSIs from the RSSI measurement time window, and separately or jointly report the six RSSIs to the network device, or the terminal device may process the six RSSIs, for example, perform arithmetic or weighted averaging, to obtain a processing result, and report the processing result to the network device, but this is not limited in this embodiment of the present disclosure.

In the example shown in FIG. 4, all the time resources in the RSSI measurement time window may be used to perform the RSSI measurement. Alternatively, only some of the time resources in the RSSI measurement time window may be used to perform the RSSI measurement. The terminal device may determine, according to a preset rule or configuration, a time resource that can be used to perform the RSSI measurement in the RSSI measurement time window. Alternatively, the indication information may further be used to indicate a time resource used to perform the RSSI measurement in the RSSI measurement time window. Accordingly, the terminal device may determine, according to the indication information, a specific part of the time resources in the RSSI measurement time window for performing the RSSI measurement, but this is not limited in this embodiment of the present disclosure.

As another optional embodiment, the indication information further includes information about an RSSI valid measurement window, and the RSSI valid measurement window represents a time resource used to perform the RSSI measurement in the RSSI measurement window.

The terminal device may determine, according to the information about the RSSI valid measurement window, the time resource used to perform the RSSI measurement in the RSSI measurement window. Optionally, the information about the RSSI valid measurement window may include information about an RSSI measurement length, and the RSSI measurement length may represent a length of the time resource used to perform the RSSI measurement in the RSSI measurement window. In this case, a location of the RSSI valid measurement window in the RSSI measurement time window may be pre-defined or pre-configured. Alternatively, the information about the RSSI valid measurement window may further include information about the location of the RSSI valid measurement window in the RSSI measurement window, but this is not limited in this embodiment of the present disclosure. Alternatively, the RSSI measurement length may represent a length of a time resource that is used to perform the RSSI measurement and that is in time resources whose length is the RSSI measurement granularity. For example, the RSSI measurement length may be a quantity M of consecutive symbols that are used to perform the RSSI measurement and that are in N symbols whose length is the RSSI measurement granularity, where $1<M<N$.

Figure 5:
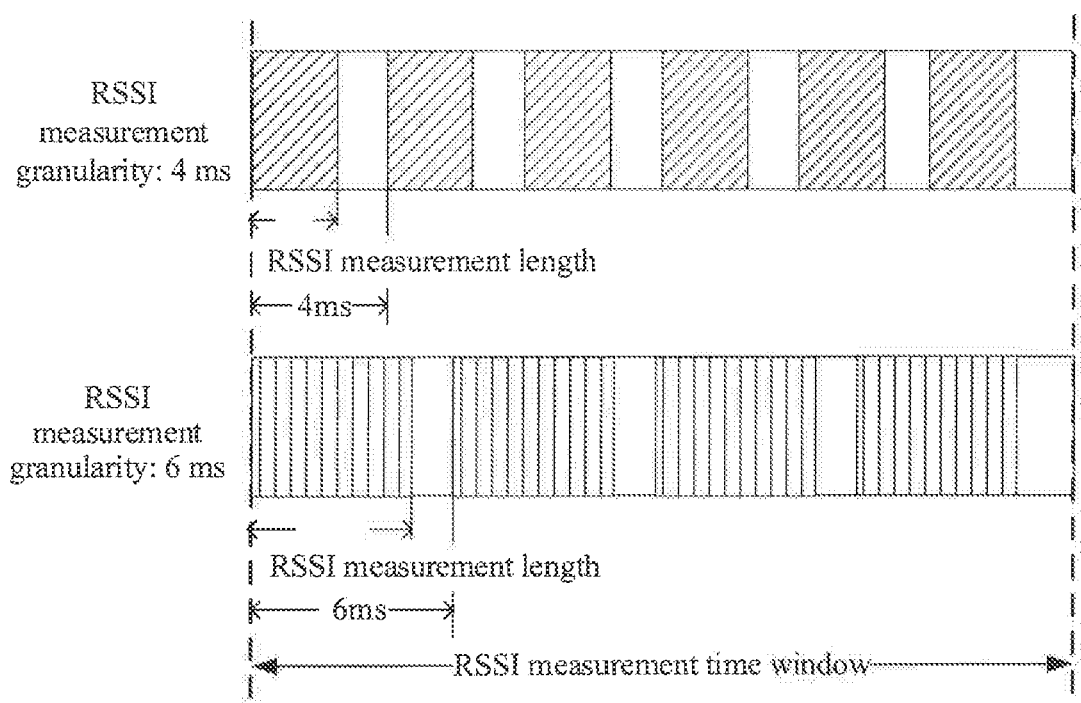
FIG. 5 is another schematic diagram of an RSSI measurement configuration in an RRM measurement method according to an embodiment of the present disclosure.

As shown in FIG. 5, in the time resources whose length is the RSSI measurement granularity, only a former part of the time resources whose length is the RSSI measurement length may be used to perform the RSSI measurement, or only a latter part, a middle part, or the like of the time resources whose length is the RSSI measurement length may be used to perform the RSSI measurement, and this is not limited in this embodiment of the present disclosure.

In this embodiment of the present disclosure, the network device may semi-statically configure the time-frequency resource used to perform the RSSI measurement on the unlicensed carrier. For example, in step S210, the network device may send RRC signaling to the terminal device, and the RRC signaling carries the indication information. In this case, optionally, the indication information may be used to indicate the RSSI measurement configuration of the unlicensed carrier. The time-frequency resource that is used to perform the RSSI measurement and that is included in the RSSI measurement configuration may be distributed in a relatively long time period. For example, the RSSI measurement time window in the RSSI measurement configuration may be periodically distributed. After receiving the indication information, the terminal device may store the indication information or the RSSI measurement configuration in order to perform the RSSI measurement on the unlicensed carrier according to the RSSI measurement configuration in a relatively long subsequent period of time. For example, before receiving indication information used to indicate an updated RSSI measurement configuration of the unlicensed carrier, the terminal device may always use the current RSSI measurement configuration to perform the RSSI measurement, but this is not limited in this embodiment of the present disclosure.

Optionally, after obtaining the RSSI measurement result, the terminal device may periodically report the RSSI measurement result to the network device. A reporting period may be the RSSI measurement granularity, that is, when obtaining an RSSI from the RSSI measurement granularity each time, the terminal device reports the obtained RSSI to the network device, or the reporting period may be multiple RSSI measurement granularities or the length of the RSSI measurement time window, and this is not limited in this embodiment of the present disclosure.

As another optional embodiment, the indication information may further be used to indicate a manner in which the terminal device reports the RSSI measurement result. For example, the indication information may further be used to indicate that the terminal device periodically reports the RSSI measurement result. For example, the indication information includes information about a reporting period, or the indication information may be used to indicate a carrier type that is used by the terminal device to report the RSSI measurement result. For example, the indication information may further be used to indicate that the terminal device uses a licensed carrier or the unlicensed carrier to report the RSSI measurement result, but this is not limited in this embodiment of the present disclosure.

As another optional embodiment, the network device may dynamically configure the time-frequency resource used to perform the RSSI measurement on the unlicensed carrier. For example, in step S210, the network device may send DCI to the terminal device, and the DCI carries the indication information. In this case, the indication information may be used to indicate that the terminal device performs RSSI measurement on an unlicensed carrier, and may indicate a time-frequency resource used to perform this RSSI measurement, that is, the foregoing time-frequency resource used to perform the RSSI measurement may be the time-frequency resource used to perform this RSSI measurement, but this is not limited in this embodiment of the present disclosure. After receiving the DCI, the terminal device may perform the RSSI measurement according to the indication information configuration, and after obtaining an RSSI measurement result of this RSSI measurement, report the RSSI measurement result to the network device, but this is not limited in this embodiment of the present disclosure.

The network device may include the indication information in the DCI in various manners, for example, use a reserved bit in the DCI to carry the indication information. Alternatively, the network device may add one or more bits to the DCI and use at least one newly-added bit of the DCI to carry the indication information, but this is not limited in this embodiment of the present disclosure.

As another optional embodiment, in step S230, the terminal device may send the RSSI measurement result to the network device on a licensed carrier, or send the RSSI measurement result to the network device on the unlicensed carrier or another unlicensed carrier, and this is not limited in this embodiment of the present disclosure.

After receiving the RSSI measurement result sent by the terminal device, the network device may determine a load or interference status of a carrier around the terminal device, identify a hidden node, perform scheduling on the terminal device or carrier selection, and the like according to the RSSI measurement result in order to improve the overall system performance.

It should be understood that sequence numbers of the foregoing processes do not mean execution sequences. Execution sequences of the processes should be determined according to functions and internal logic of the processes, and shall not constitute any limitation on implementation processes of the embodiments of the present disclosure.

The foregoing describes in detail the RRM measurement method according to the embodiments of the present disclosure with reference to FIG. 1 to FIG. 5, and the following describes in detail an RRM measurement apparatus according to the embodiments of the present disclosure with reference to FIG. 6 to FIG. 9.

Figure 6:
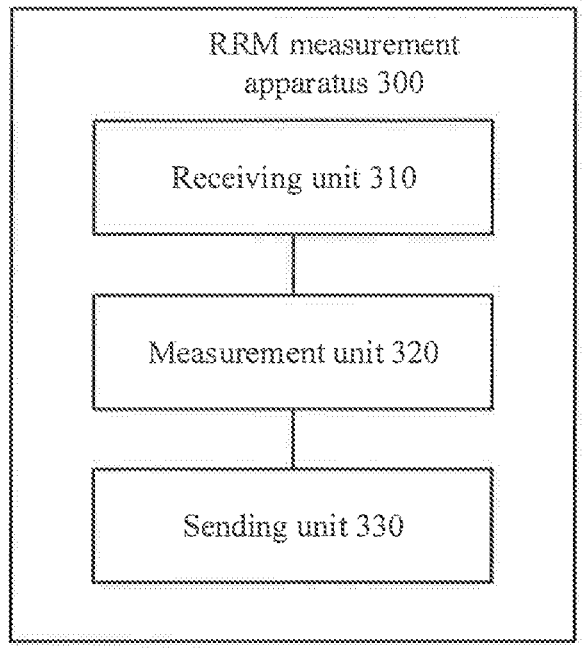
FIG. 6 is a schematic block diagram of an RRM measurement apparatus according to an embodiment of the present disclosure.

FIG. 6 shows an RRM measurement apparatus 300 according to an embodiment of the present disclosure, and the apparatus 300 includes a receiving unit 310 configured to receive indication information sent by a network device, where the indication information indicates a time-frequency resource used to perform RSSI measurement on an unlicensed carrier, and/or the indication information instructs the terminal device to perform, without depending on a signal sent by a serving cell, the RSSI measurement on the unlicensed carrier, a measurement unit 320 configured to perform, on the time-frequency resource indicated by the indication information received by the receiving unit 310, the RSSI measurement on the unlicensed carrier to obtain an RSSI measurement result, and a sending unit 330 configured to send the RSSI measurement result obtained by the measurement unit 320 to the network device.

Optionally, a time resource used to perform the RSSI measurement on the unlicensed carrier is different from a DMTC of the unlicensed carrier.

Optionally, the measurement unit 320 is further configured to determine a total receive power that is from at least one source and that is detected on the time-frequency resource, where the at least one source does not include the signal sent by the serving cell of the terminal device on the unlicensed carrier, and process the total receive power to obtain the RSSI measurement result.

Optionally, the indication information includes information about an RSSI measurement time window and/or information about an RSSI measurement granularity.

Optionally, the RSSI measurement time window is different from the DMTC.

Optionally, the indication information further includes information about an RSSI valid measurement window, where the RSSI valid measurement window represents a time resource used to perform the RSSI measurement in the RSSI measurement window.

Optionally, the indication information is carried in RRC signaling.

Optionally, the indication information is carried in DCI, and optionally, the indication information may be carried in a newly-added bit of the DCI.

Optionally, the sending unit 330 is further configured to send the RSSI measurement result to the network device on a licensed carrier, or send the RSSI measurement result to the network device on the unlicensed carrier.

It should be noted that the apparatus 300 herein is presented in a form of a functional unit. A term "unit" herein may indicate an application specific integrated circuit (ASIC), an electronic circuit, a processor (for example, a shared processor, a dedicated processor, or a group processor) used to execute one or more software or firmware programs and a memory, a combined logic circuit, and/or another proper component that supports a described function. In an optional example, a person skilled in the art may understand that, the apparatus 300 may be the terminal device in the foregoing embodiments, and the apparatus 300 may be configured to execute procedures and/or steps corresponding to the terminal device in the foregoing method embodiments. To avoid repetition, details are not described herein again.

Figure 7:
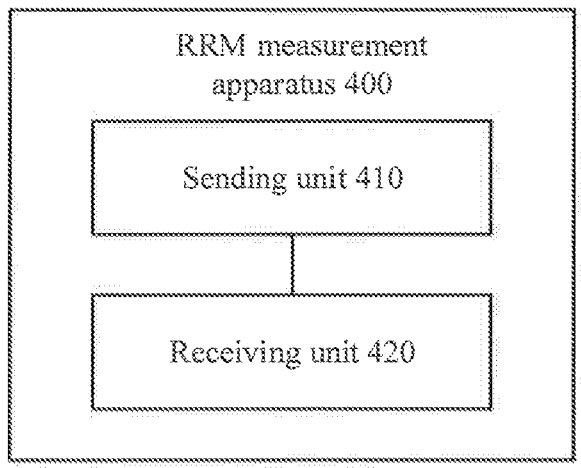
FIG. 7 is a schematic block diagram of another RRM measurement apparatus according to an embodiment of the present disclosure.

FIG. 7 shows an RRM measurement apparatus 400 according to an embodiment of the present disclosure. The apparatus 400 includes a sending unit 410 configured to send indication information to a terminal device, where the indication information indicates a time-frequency resource used to perform RSSI measurement on an unlicensed carrier, and/or the indication information instructs the terminal device to perform, without depending on a signal sent by a serving cell, the RSSI measurement on the unlicensed carrier, and a receiving unit 420 configured to receive an RSSI measurement result sent by the terminal device, where the RSSI measurement result is obtained by the terminal device by performing the RSSI measurement on the time-frequency resource indicated by the indication information sent by the sending unit 410.

Optionally, a time resource used to perform the RSSI measurement on the unlicensed carrier is different from a DMTC of the unlicensed carrier.

Optionally, the RSSI measurement result is obtained by the terminal device by processing a total receive power that is from at least one source and that is detected on the time-frequency resource, where the at least one source does not include the signal sent by the serving cell of the terminal device on the unlicensed carrier.

Optionally, the indication information includes information about an RSSI measurement time window and/or information about an RSSI measurement granularity. Optionally, the RSSI measurement time window may be different from the DMTC.

Optionally, the indication information further includes information about an RSSI valid measurement window, where the RSSI valid measurement window represents a time resource used to perform the RSSI measurement in the RSSI measurement window.

Optionally, the indication information is carried in RRC signaling.

Optionally, the indication information is carried in a newly-added bit of DCI.

Optionally, the receiving unit 420 is further configured to receive the RSSI measurement result sent by the terminal device on a licensed carrier according to the indication information, or receive the RSSI measurement result sent by the terminal device on the unlicensed carrier according to the indication information.

It should be noted that the apparatus 400 herein is presented in a form of a functional unit. A term "unit" herein may indicate an ASIC, an electronic circuit, a processor (for example, a shared processor, a dedicated processor, or a group processor) used to execute one or more software or firmware programs and a memory, a combined logic circuit, and/or another proper component that supports a described function. In an optional example, a person skilled in the art may understand that, the apparatus 400 may be the network device in the foregoing embodiments, and the apparatus 400 may be configured to execute procedures and/or steps corresponding to the network device in the foregoing method embodiments. To avoid repetition, details are not described herein again.

Figure 8:
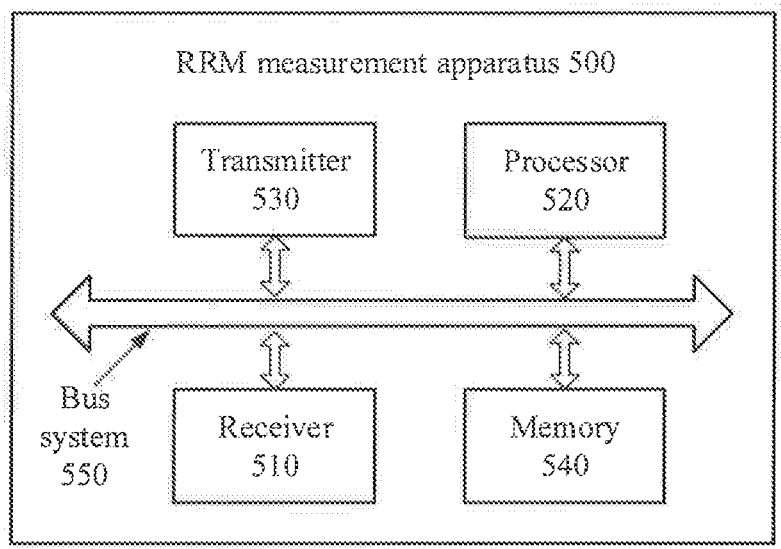
FIG. 8 is a schematic block diagram of another RRM measurement apparatus according to an embodiment of the present disclosure.

FIG. 8 shows an RRM measurement apparatus 500 according to an embodiment of the present disclosure. The apparatus 500 includes a receiver 510, a processor 520, a transmitter 530, a memory 540, and a bus system 550. The receiver 510, the processor 520, the transmitter 530, and the memory 540 are connected using the bus system 550, the memory 540 is configured to store an instruction, and the processor 520 is configured to execute the instruction stored in the memory 540 in order to control the receiver 510 to receive a signal and control the transmitter 530 to send an instruction.

The receiver 510 is configured to receive indication information sent by a network device, where the indication information indicates a time-frequency resource used to perform RSSI measurement on an unlicensed carrier, and/or the indication information instructs the terminal device to perform, without depending on a signal sent by a serving cell, the RSSI measurement on the unlicensed carrier.

The processor 520 is configured to perform, on the time-frequency resource indicated by the indication information received by the receiver 510, the RSSI measurement on the unlicensed carrier to obtain an RSSI measurement result.

The transmitter 530 is configured to send the RSSI measurement result obtained by the processor 520 to the network device.

Optionally, a time resource used to perform the RSSI measurement on the unlicensed carrier is different from a DMTC of the unlicensed carrier.

Optionally, the processor 520 is further configured to determine a total receive power that is from at least one source and that is detected on the time-frequency resource, where the at least one source does not include the signal sent by the serving cell of the terminal device on the unlicensed carrier, and process the total receive power to obtain the RSSI measurement result.

Optionally, the indication information includes information about an RSSI measurement time window and/or information about an RSSI measurement granularity.

Optionally, the RSSI measurement time window is different from the DMTC.

Optionally, the indication information further includes information about an RSSI valid measurement window, where the RSSI valid measurement window represents a time resource used to perform the RSSI measurement in the RSSI measurement window.

Optionally, the indication information is carried in RRC signaling.

Optionally, the indication information is carried in DCI, and optionally, the indication information may be carried in a newly-added bit of the DCI.

Optionally, the transmitter 530 is further configured to send the RSSI measurement result to the network device on a licensed carrier, or send the RSSI measurement result to the network device on the unlicensed carrier.

It should be noted that the apparatus 500 may be the terminal device in the foregoing embodiments, and may be configured to execute steps and/or procedures corresponding to the terminal device in the foregoing method embodiments. Optionally, the memory 540 may include a read-only memory (ROM) and a random access memory (RAM), and provide an instruction and data for the processor 520. A part of the memory 540 may further include a non-volatile RAM (NVRAM). For example, the memory 540 may further store information about a device type. The processor 520 may be configured to execute the instruction stored in the memory 540, and when the processor 520 executes the instruction, the processor 520 may execute steps corresponding to the terminal device in the foregoing method embodiments.

Figure 9:
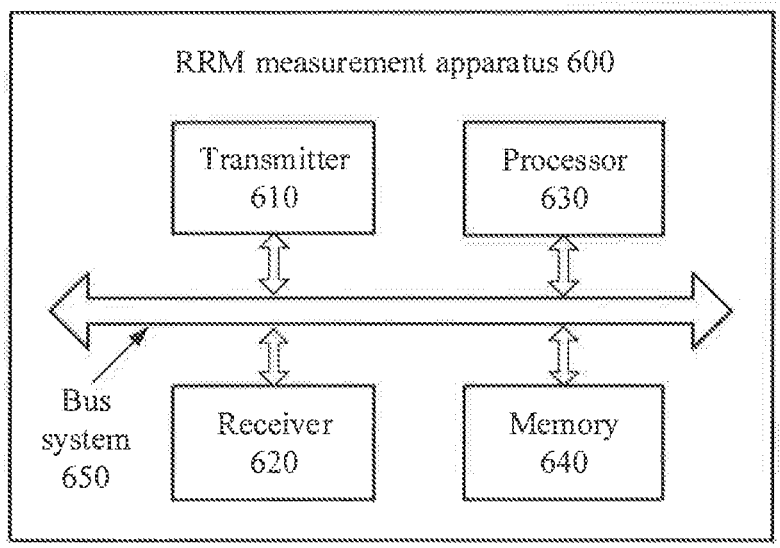
FIG. 9 is a schematic block diagram of another RRM measurement apparatus according to an embodiment of the present disclosure.

FIG. 9 shows an RRM measurement apparatus 600 according to an embodiment of the present disclosure. The apparatus 600 includes a transmitter 610, a receiver 620, a processor 630, a memory 640, and a bus system 650. The transmitter 610, the receiver 620, the processor 630, and the memory 640 are connected using the bus system 650, the memory 640 is configured to store an instruction, and the processor 630 is configured to execute the instruction stored in the memory 640 in order to control the transmitter 610 to send a signal and control the receiver 620 to receive a signal.

The transmitter 610 is configured to send indication information to a terminal device, where the indication information indicates a time-frequency resource used to perform RSSI measurement on an unlicensed carrier, and/or the indication information instructs the terminal device to perform, without depending on a signal sent by a serving cell, the RSSI measurement on the unlicensed carrier.

The receiver 620 is configured to receive an RSSI measurement result sent by the terminal device, where the RSSI measurement result is obtained by the terminal device by performing the RSSI measurement on the time-frequency resource indicated by the indication information sent by the transmitter 610.

Optionally, a time resource used to perform the RSSI measurement on the unlicensed carrier is different from a DMTC of the unlicensed carrier.

Optionally, the RSSI measurement result is obtained by the terminal device by processing a total receive power that is from at least one source and that is detected on the time-frequency resource, where the at least one source does not include the signal sent by the serving cell of the terminal device on the unlicensed carrier.

Optionally, the indication information includes information about an RSSI measurement time window and/or information about an RSSI measurement granularity. Optionally, the RSSI measurement time window may be different from the DMTC.

Optionally, the indication information further includes information about an RSSI valid measurement window, where the RSSI valid measurement window represents a time resource used to perform the RSSI measurement in the RSSI measurement window.

Optionally, the indication information is carried in RRC signaling.

Optionally, the indication information is carried in a newly-added bit of DCI.

Optionally, the receiver 620 is further configured to receive the RSSI measurement result sent by the terminal device on a licensed carrier according to the indication information, or receive the RSSI measurement result sent by the terminal device on the unlicensed carrier according to the indication information.

It should be noted that the apparatus 600 may be the network device in the foregoing embodiments, and may be configured to execute steps and/or procedures corresponding to the network device in the foregoing method embodiments. Optionally, the memory 640 may include a ROM and a RAM, and provide an instruction and data for the processor 630. A part of the memory 640 may further include a NVRAM. For example, the memory 640 may further store information about a device type. The processor 630 may be configured to execute the instruction stored in the memory 640, and when the processor 630 executes the instruction stored in the memory 640, the processor 630 is configured to execute steps and/or procedures in the foregoing method embodiments.

It should be understood that in the embodiment of the present disclosure, the processor 520, 630 may be a central processing unit (CPU), or the processor 520, 630 may be another general purpose processor, a digital signal processor (DSP), an ASIC, a field programmable gate array (FPGA), or another programmable logic device, discrete gate or transistor logic device, discrete hardware component, or the like. The general purpose processor may be a microprocessor or the processor 520, 630 may be any normal processor, or the like.

In an implementation process, steps in the foregoing methods can be implemented using a hardware integrated logical circuit in the processor 520, 630, or using instructions in a form of software. The steps of the method disclosed with reference to the embodiments of the present disclosure may be directly performed by a hardware processor, or may be performed using a combination of hardware in the processor 520, 630 and a software module. A software module may be located in a mature storage medium in the art, such as a RAM, a flash memory, a ROM, a programmable ROM (PROM), an electrically erasable PROM (EEPROM), a register, or the like. The storage medium is located in the memory 540, 640, and a processor 520, 630 reads instructions in the memory 540, 640 and completes the steps in the foregoing methods in combination with hardware of the processor 520, 630. To avoid repetition, details are not described herein again.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A radio resource management (RRM) measurement method, implemented by a terminal device, the method comprising:
receiving indication information from a network device, wherein the indication information indicates a time-frequency resource for performing received signal strength indicator (RSSI) measurement on an unlicensed carrier, wherein the indication information comprises RSSI measurement time window information, RSSI measurement granularity information, and RSSI valid measurement window information, wherein the RSSI valid measurement window information represents a time resource for performing the RSSI measurement in the RSSI measurement time window, and wherein the indication information is carried in radio resource control (RRC) signaling;
performing, on the time-frequency resource, the RSSI measurement on the unlicensed carrier to obtain an RSSI measurement result base on the RSSI measurement time window, the RSSI measurement granularity, and the RSSI valid measurement window;
and
sending periodically the RSSI measurement result to the network device.

2. The RRM measurement method of claim 1, wherein a time resource used to perform the RSSI measurement on the unlicensed carrier is different from a discovery signals measurement timing configuration (DMTC) of the unlicensed carrier.

3. The RRM measurement method of claim 1, wherein performing the RSSI measurement on the unlicensed carrier to obtain the RSSI measurement result comprises:
determining a total receive power from a source detected on the time-frequency resource, wherein the source does not comprise a signal from the serving cell of the terminal device on the unlicensed carrier; and
processing the total receive power to obtain the RSSI measurement result.

4. The RRM measurement method of claim 1, wherein the indication information is carried in downlink control information (DCI).

5. The RRM measurement method of claim 1, wherein sending the RSSI measurement result to the network device comprises sending the RSSI measurement result to the network device on a licensed carrier.

6. The RRM measurement method of claim 1, wherein sending the RSSI measurement result to the network device comprises sending the RSSI measurement result to the network device on the unlicensed carrier.

7. A radio resource management (RRM) measurement method, implemented by a network device, comprising:
sending indication information to a terminal device, wherein the indication information indicates a time-frequency resource for performing received signal strength indicator (RSSI) measurement on an unlicensed carrier, wherein the indication information comprises RSSI measurement time window information, RSSI measurement granularity information, and RSSI valid measurement window information, wherein the RSSI valid measurement window information represents a time resource for performing the RSSI measurement in the RSSI measurement time window, and wherein the indication information is carried in radio resource control (RRC) signaling; and
receiving periodically an RSSI measurement result from the terminal device, wherein the RSSI measurement result is obtained by the terminal device by performing the RSSI measurement on the time-frequency resource.

8. The RRM measurement method of claim 7, wherein a time resource used to perform the RSSI measurement on the unlicensed carrier is different from a discovery signals measurement timing configuration (DMTC) of the unlicensed carrier.

9. The RRM measurement method of claim 7, wherein the RSSI measurement result is obtained by the terminal device processing a total receive power from a source detected on the time-frequency resource, and wherein the a source does not comprise a signal from the serving cell of the terminal device on the unlicensed carrier.

10. A radio resource management (RRM) measurement apparatus, applied in a terminal device, comprising: a memory configured to store computer executable instructions;

a processor coupled to the memory and the terminal device and configured to execute the computer executable instructions to cause the terminal device to:

receive indication information from a network device, wherein the indication information indicates a time-frequency resource for performing received signal strength indicator (RSSI) measurement on an unlicensed carrier, wherein the indication information comprises RSSI measurement time window information, RSSI measurement granularity information, and RSSI valid measurement window information, wherein the RSSI valid measurement window information represents a time resource for performing the RSSI measurement in the RSSI measurement time window, and wherein the indication information is carried in radio resource control (RRC) signaling;

perform, on the time-frequency resource, the RSSI measurement on the unlicensed carrier to obtain an RSSI measurement result base on the RSSI measurement time window, the RSSI measurement granularity, and the RSSI valid measurement window; and send periodically the RSSI measurement result to the network device.

11. The RRM measurement apparatus of claim 10, wherein a time resource for performing the RSSI measurement on the unlicensed carrier is different from a discovery signals measurement timing configuration (DMTC) of the unlicensed carrier.

12. The RRM measurement apparatus of claim 10, wherein the processor is further configured to cause the terminal device to:

determine a total receive power from a source detected on the time-frequency resource, wherein the source does not comprise a signal from the serving cell of the terminal device on the unlicensed carrier; and process the total receive power to obtain the RSSI measurement result.

13. The RRM measurement apparatus of claim 10, wherein the transmitter is further configured to send the RSSI measurement result to the network device on a licensed carrier.

14. The RRM measurement apparatus of claim 10, wherein the transmitter is further configured to send the RSSI measurement result to the network device on the unlicensed carrier.

* * * * *